March 3, 1931.    H. C. LEWIS    1,795,174
TREE MOVING MACHINE
Filed Dec. 28, 1928    3 Sheets-Sheet 3
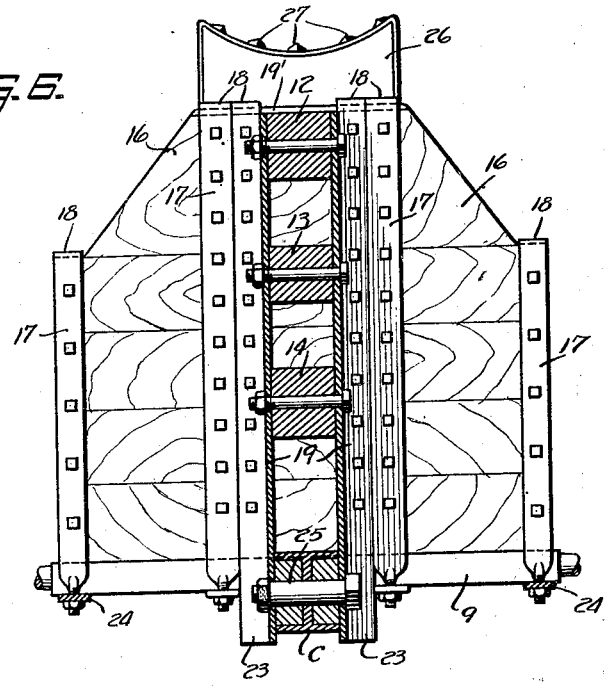
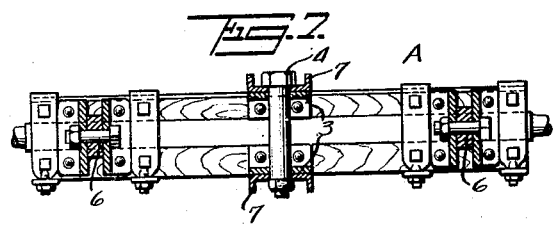
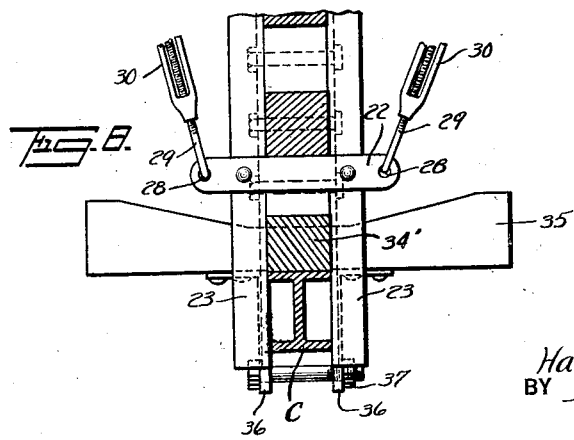
WITNESSES
INVENTOR
Harold C. Lewis
BY
ATTORNEY Patented Mar. 3, 1931

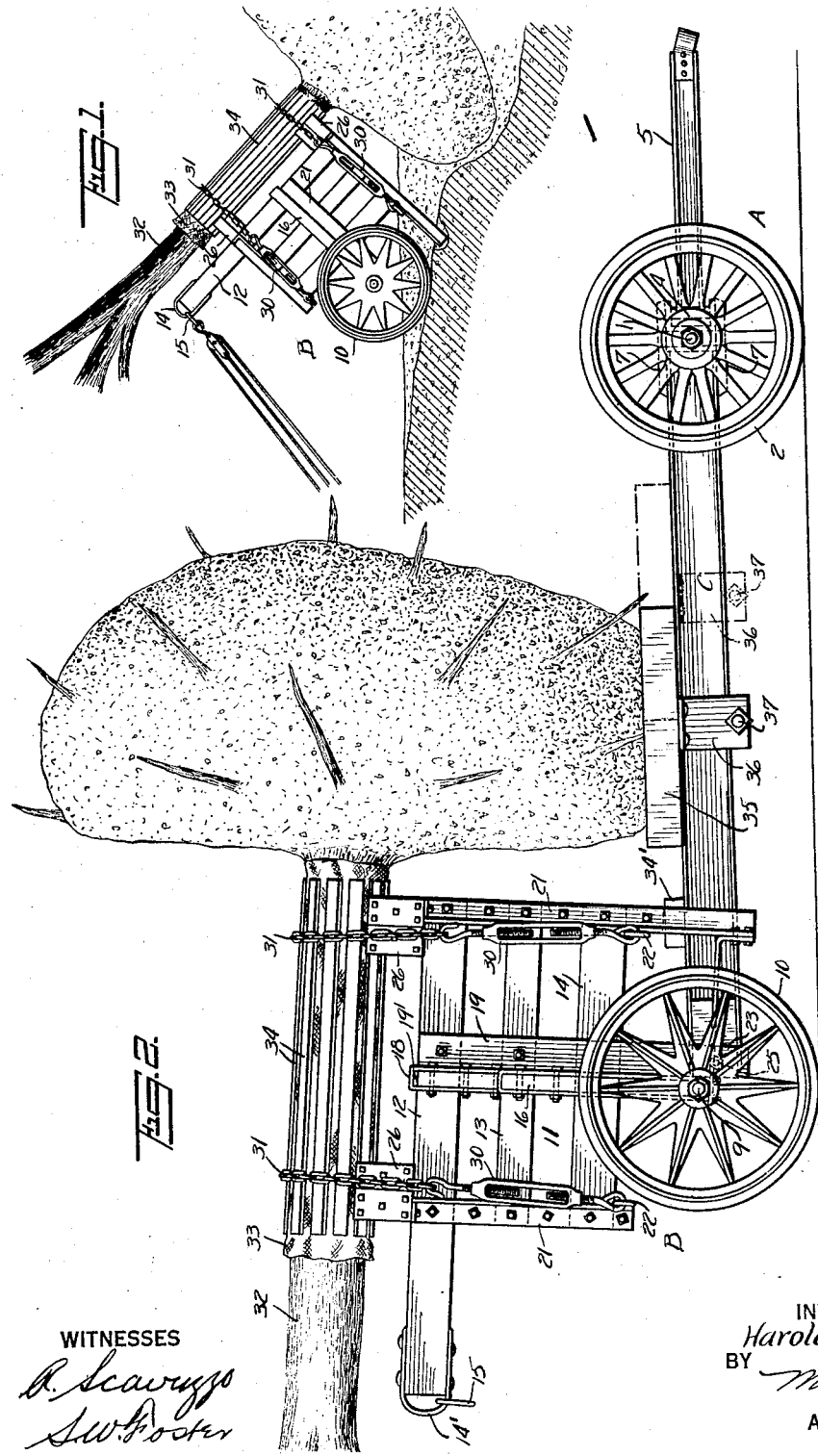

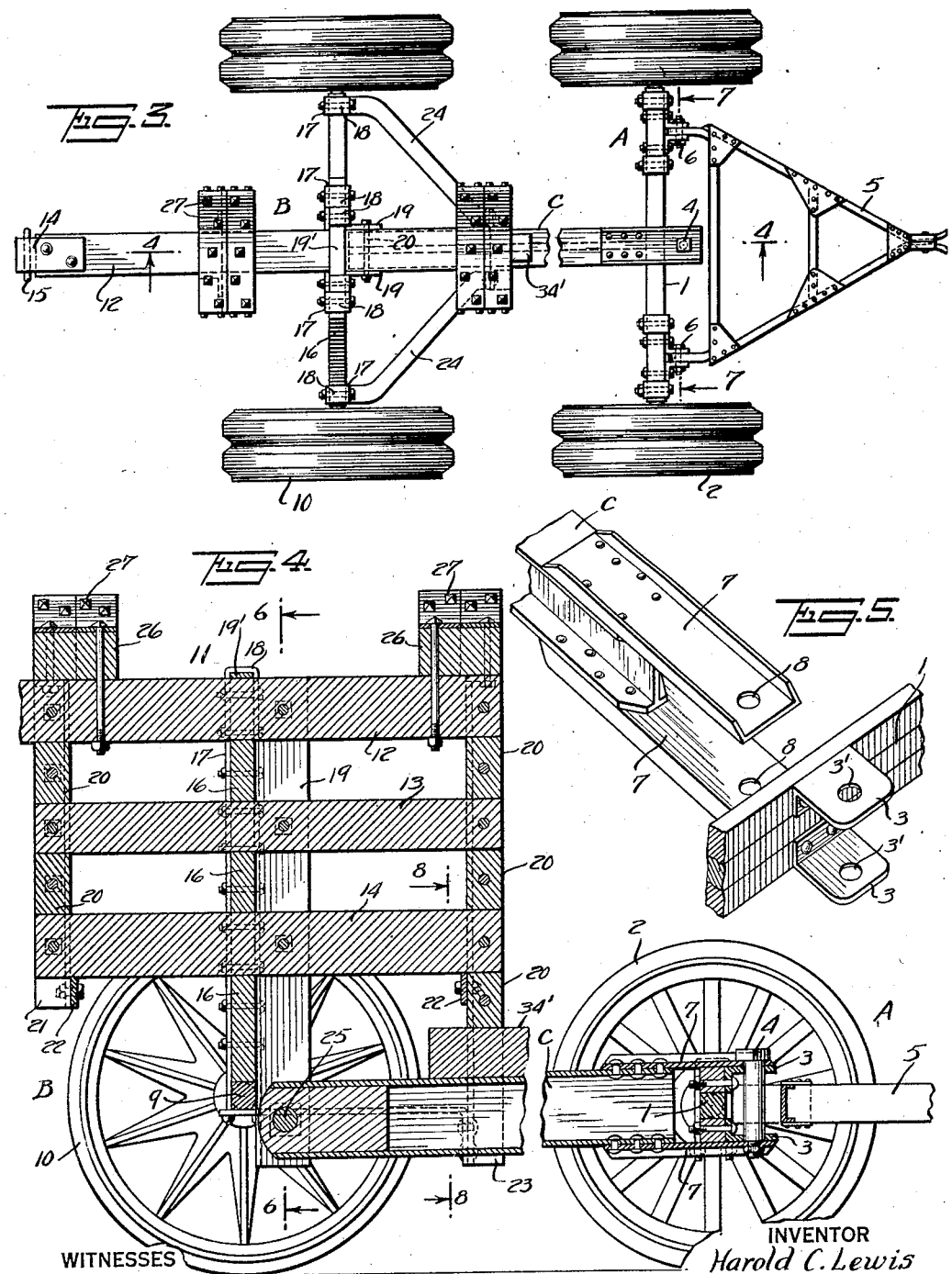

1,795,174

UNITED STATES PATENT OFFICE

HAROLD C. LEWIS, ROSLYN, NEW YORK

TREE-MOVING MACHINE

Application filed December 28, 1928. Serial No. 329,035.

This invention relates to tree moving machines and more particularly to an apparatus or machine for use in transplanting large trees.

An object of the invention is to provide an apparatus of this character which greatly facilitates the removal of trees, the movement of trees and the transplanting of the trees, and which is of maximum strength and durability.

A further object is to provide an apparatus of this character which includes a novel construction of fore carriage, a novel construction of rear carriage or cradle and a relatively short reach removably connected with the fore and rear carriages.

With these and other objects in view, the invention consists in certain novel features of construction and combinations and arrangements of parts, which will be more fully hereinafter described and pointed out in the claim.

In the accompanying drawings—

Figure 1 is a view in elevation illustrating the rear carriage or cradle in the operation of removing a tree or lowering a tree in transplanted position;

Figure 2 is a view in side elevation of the assembled machine or apparatus ready for transporting a tree from place to place;

Figure 3 is a broken plan view thereof;

Figure 4 is a broken enlarged view in longitudinal section on the line 4—4 of Figure 3;

Figure 5 is a fragmentary perspective view of the forward end of the reach and the intermediate portion of the axle;

Figure 6 is a view in transverse section on the line 6—6 of Figure 4;

Figure 7 is a view in transverse section on the line 7—7 of Figure 3;

Figure 8 is a fragmentary view in section on the line 8—8 of Figure 4.

My improved tree moving machine comprises three main parts, namely, a fore carriage A, a rear carriage or cradle B and a reach C connecting the carriage, all of which will be more fully hereinafter described in detail.

The fore carriage A comprises an axle 1, supported by wheels 2 and provided centrally with forwardly projecting parallel plates 3, 3 having openings 3' therein to receive a king bolt 4 connecting the reach C to the axle. The axle 1 is preferably made up of a series of members, the intermediate of which may be of metal and the other members be of wood, although the invention is not limited to any particular construction of axle.

A triangular-shaped tongue 5 is pivotally connected to the axle 1, as shown at 6, and this tongue 5 is preferably made up of angle bars and plates so as to provide a strong and rigid construction for coupling attachment to a tractor or other means for moving the machine.

The reach C preferably comprises an I-beam having secured on its upper and lower faces at its forward end angle bars 7, 7 which project beyond the I-beams and are adapted to be positioned over the axle 1 and are made with openings 8 which receive the king bolt 4 above referred to.

By reason of this construction it will be noted that the reach is supported on the front axle and the king bolt is relieved of the weight of the forward end of the reach and a strong coupling is had between the reach and front axle.

The rear carriage includes an axle 9 supported by wheels 10 and on this axle a tilting cradle 11 is provided. While I use the reference character B to indicate the entire rear carriage, for clearness of description I shall hereinafter employ the reference character to indicate the cradle as distinguished from the carriage as a whole.

This cradle 11 comprises a series of longitudinally extending beams, and while I may employ any number of these beams I have illustrated three located one above the other, spaced apart and given the reference numerals 12, 13 and 14, respectively. The upper beam 12 is appreciably longer than the lower beams and extends rearwardly the desired distance and has a strap loop 14' thereon for the attachment of a chain or other device 15 so that this upper beam 12 in reality constitutes a lever for moving the axle.

Transverse bars 16 extend across the machine above the rear axle 9, one of these bars 16 being below the lowermost beam 14, and the other bar 16 between the beams, and any desired number of metal straps 17 are positioned beside the bars 16 and have hooked upper ends 18 extending over a metal strip 19' above the upper beam 12, and when these straps are bolted to the bars they form a rigid central support for the cradle.

At the front of the bars 16 and at opposite sides of the beams 12, 13 and 14, forwardly projecting angle bars 19 are secured, preferably by the same bolts 7 that are employed to secure the straps 17.

Blocks 20 are located between the beams 12, 13 and 14, and a similar block 20 is located under the forward end of the beam 14, and these blocks are securely bolted to angle bars 21 at the sides of the blocks and beams and at the forward and rear ends of the cradle.

The angle bars 21 at the front and rear of the cradle are connnected by straps 22 extending under the lower beam 14, and the angle bars 21 at the forward end of the cradle extend downwardly and are appreciably longer than the rear angle bars 21 so as to provide parallel guides 23 between which the reach C is located.

These guides 23 are strengthened by lateral braces 24 secured under the rear axle 9 and to certain of the straps 17 adjacent the ends of the axle, as clearly illustrated in Figures 3 and 6 of the drawings.

I have purposely avoided the employment of reference characters to indicate bolts, rivets, etc. on the drawings to avoid a multiplicity of reference characters, as it is perfectly obvious that the parts may be bolted, riveted or otherwise secured.

The angle bars 19 above referred to extend downwardly to all points appreciably below the plane of the axle 9 and provide a mounting for a removable bolt 25 which is removably projected through the rear end of the reach C so that by means of this bolt the reach is secured to the rear carriage or cradle and is held against lateral motion by means of the angle bars 21 and by the guides 23 before referred to.

On the cradle 11 at its front and rear ends saddles 26 are secured and may contain spurs 27 thereon to prevent slipping of the tree trunk when in position on the saddle.

The straps 22 located at the front and rear and lower portion of the cradle extend beyond the sides of the cradle and are perforated, as at 28, to accommodate the hooked ends 29 of turnbuckles 30, said turnbuckles connected by chains 31 which are adapted to be extended over a tree trunk 32 to bind the same on the cradle.

In actual use the tree trunk 32 is protected by a covering 33 and slats 34 extending longitudinally of the trunk outside of the covering 33, and the chains 31 come in direct contact with the slats so that the trunk of the tree is not injured in handling or in transportation.

A cushioning block 34' is adapted to be inserted between the forward end of the cradle and the reach C to give the proper angle to the cradle and cushion the latter. The block 34' is preferably of rubber although it may be otherwise constructed, so that it constitutes in effect a cushion to take up jars and jolts which would otherwise be imparted to the tree trunk and might injure the latter.

As a supporting means for the block for the earth around the roots I preferably provide a movable platform 35, which is slidable on the reach C, and has angle brackets 36 extending down besides the reach, and a clamping bolt 37 extends through these angle brackets 36 so as to clamp the reach and locate the platform at any position desired.

The operation of the machine is as follows:

Figure 1 shows the rear carriage or cradle in position to remove a tree wherein it will be seen that power is transmitted to the rear end of the lever or beam 12 after the cradle has been secured to the tree trunk, so as to tilt the cradle and draw the roots and earth clinging to the roots from the ground and move the tree into a substantially horizontal position. When this is accomplished the reach C is secured to the rear carriage or cradle through the medium of the bolt 25, and the cradle may be tilted to any desired angle in accordance with the foliage of the tree and the size of the roots and earth, and when given the proper tilt the block 34' may be positioned between the reach C and the lower block 20 at the forward end of the cradle so as to hold the cradle at the proper angle. It is assumed of course that the forward end of the reach is coupled to the forward carriage by the king bolt 4 when the machine is ready for transportation.

With a machine of this character the fore carriage and the rear carriage may be connected to or disconnected from the reach C whenever desired and by reason of the construction the reach may be relatively short, which is of great advantage not only because of the added strength of the apparatus as a whole but in the fact that the machine may be more easily manipulated in a smaller space than would be possible with a long reach.

While I have illustrated what I believe to be a preferred embodiment of my invention it is obvious various changes and alterations might be made in the general form of the parts described without departing from my invention and hence I do not limit myself to the precise details set forth but consider myself at liberty to make such changes and alterations as fairly fall within the spirit and scope of the appended claim.

I claim:

A rear carriage for a tree moving machine, including a tilting tree supporting cradle, which constitutes a part of the rear carriage, an axle on the rear carriage supporting the cradle, means on the cradle for the reception of a reach in front of the rear axle, means supporting the forward portion of the cradle on the reach, said cradle comprising longitudinal booms located one above the other and spaced apart, the upper boom extending forwardly of the cradle and constituting a lever, saddles on the upper boom, angle irons secured centrally of the cradle, and a bolt directed through the angle irons and through the reach removably coupling said parts together.

HAROLD C. LEWIS.